United States Patent
Nolan et al.

(10) Patent No.: US 7,531,248 B1
(45) Date of Patent: *May 12, 2009

(54) PERPENDICULAR RECORDING MAGNETIC MEDIA HAVING A GRANULAR MAGNETIC RECORDING LAYER AND AN AMORPHOUS SOFT UNDERLAYER

(75) Inventors: Thomas Patrick Nolan, Fremont, CA (US); Zhong Stella Wu, Fremont, CA (US); Samuel D. Harkness, IV, Berkeley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 503 days.

This patent is subject to a terminal disclaimer.

(21) Appl. No.: 11/017,657

(22) Filed: Dec. 22, 2004

(51) Int. Cl.
*G11B 5/667* (2006.01)
(52) U.S. Cl. ............ 428/829; 428/836.2; 428/836.3; 360/131
(58) Field of Classification Search .......... None
See application file for complete search history.

(56) References Cited

U.S. PATENT DOCUMENTS

| | | | |
|---|---|---|---|
| 5,652,054 A | 7/1997 | Kikitsu et al. | |
| 5,679,473 A | 10/1997 | Murayama et al. | |
| 6,217,723 B1 | 4/2001 | Bloemen et al. | |
| 6,686,070 B1 * | 2/2004 | Futamoto et al. | 428/827 |
| 6,794,028 B2 | 9/2004 | Uwazumi et al. | |
| 7,033,685 B2 * | 4/2006 | Lee et al. | 428/828 |
| 7,056,606 B2 * | 6/2006 | Shimizu et al. | 428/832.1 |
| 7,060,376 B1 * | 6/2006 | Chang et al. | 428/832 |
| 7,169,488 B2 * | 1/2007 | Chen et al. | 428/833.3 |
| 7,311,983 B2 * | 12/2007 | Watanabe et al. | 428/829 |
| 2003/0064249 A1 | 4/2003 | Uwazumi et al. | |
| 2003/0091868 A1 * | 5/2003 | Shimizu et al. | 428/694 TM |
| 2006/0246323 A1 * | 11/2006 | Liu et al. | 428/829 |
| 2008/0084632 A1 * | 4/2008 | Shimizu | 360/131 |

* cited by examiner

*Primary Examiner*—Kevin M Bernatz
(74) *Attorney, Agent, or Firm*—Shumaker & Sieffert, P.A.

(57) ABSTRACT

A perpendicular magnetic recording medium having a substrate, an amorphous soft underlayer of thickness 30 nm or greater, and a granular magnetic recording layer for perpendicular recording is disclosed. The granular magnetic recording layer includes a non-magnetic region between magnetic grains, wherein the non-magnetic region includes metal nitride or metal carbide and provides exchange decoupling between the magnetic grains. The perpendicular recording medium of this invention reduces DC noise and increases media signal-to-noise ratio; it reduces surface roughness, which in turn reduces the head-to-media spacing and the head-to-amorphous soft underlayer spacing.

15 Claims, 2 Drawing Sheets

Protective Layer 16

Magnetic recording layer 15

2$^{nd}$ Non-magnetic intermediate layer 14 (optional)

1$^{st}$ Non-magnetic intermediate layer 13 (optional)

Soft magnetic underlayer 12

Seedlayer 11 (optional)

Substrate 10

Figures 2(a) (top) and 2(b) (bottom).
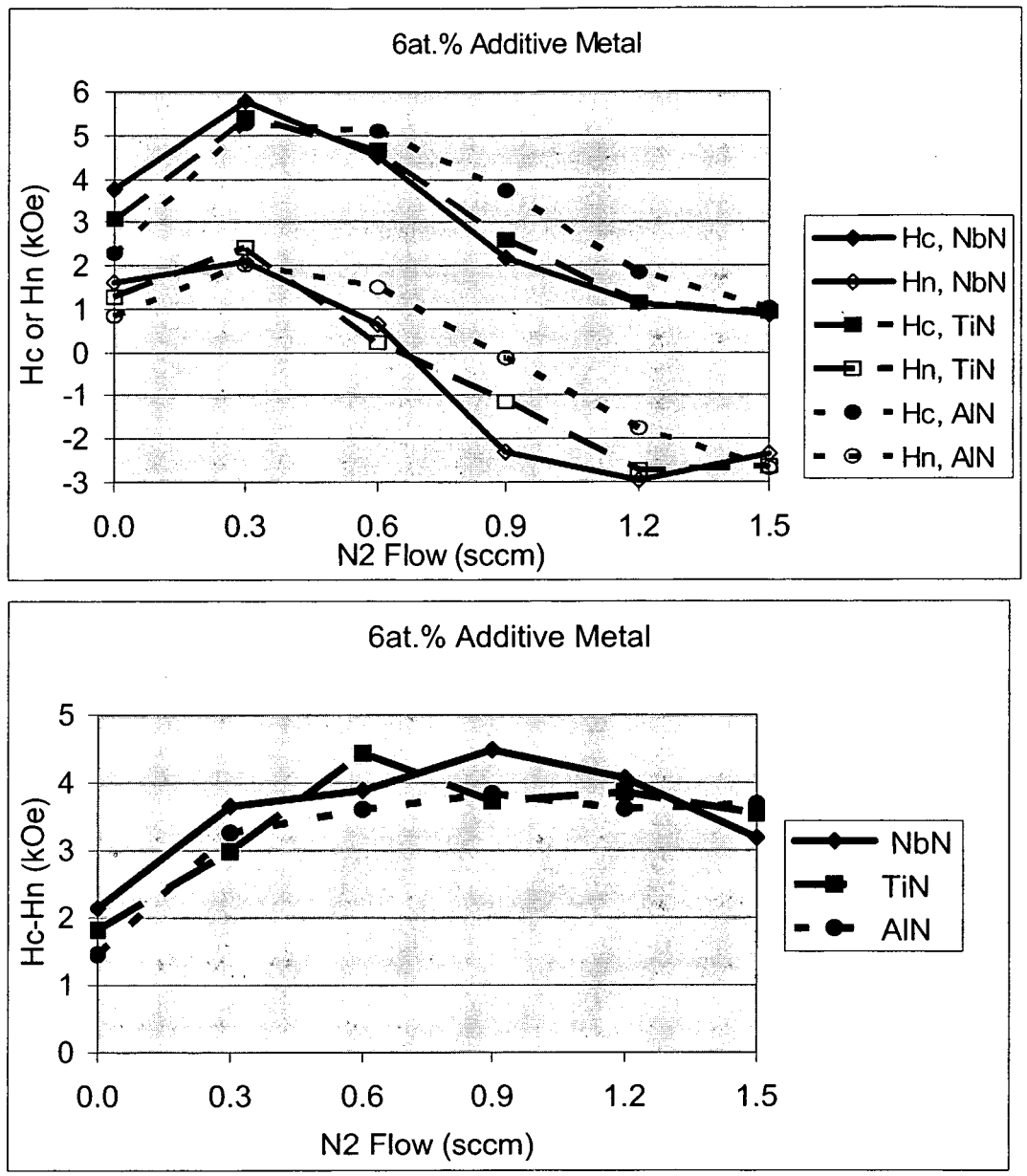

PERPENDICULAR RECORDING MAGNETIC MEDIA HAVING A GRANULAR MAGNETIC RECORDING LAYER AND AN AMORPHOUS SOFT UNDERLAYER

FIELD OF INVENTION

The present invention relates to the recording, storage and reading of magnetic data in a perpendicular magnetic media having a granular magnetic recording layer, wherein the granular layer contains ferromagnetic grains and a non-ferromagnetic phase containing non-oxygen containing material(s).

BACKGROUND

A magnetic material is composed of a number of domains. Each domain contains parallel atomic moments and is magnetized to saturation, but the directions of magnetization of different domains are not necessarily parallel. Local preferred directions of magnetization depend upon the underlying microscopic structure of the material. Magnetic recording media microstructure generally includes grains or particles comprising regions of constant crystal structure or geometry. The local directions of easiest magnetization depend upon the geometry of the crystals. In the absence of an applied magnetic field, adjacent domains may be oriented in different directions, controlled by the underlying grain structure. The resultant effect of all these various directions of magnetization may be zero, as is the case with an unmagnetized specimen. When a magnetic field is applied, domain nearly parallel to the direction of the applied field become more prevalent at the expense of the others. A further increase in magnetic field causes more domains to rotate and align parallel to the applied field. When the material reaches the point of saturation magnetization, all domains are parallel to the applied field and no further domain growth or rotation would take place on increasing the strength of the magnetic field.

The ease of magnetization or demagnetization of a magnetic material depends on material parameters including composition, crystal structure, grain orientation, and the state of strain. The magnetization is most easily obtained along the easy axis of magnetization but most difficult along the hard axis of magnetization. A magnetic material is said to possess a magnetic anisotropy when easy and hard axes exist. On the other hand, a magnetic material is said to be isotropic when there are no easy or hard axes.

In a perpendicular recording media, magnetization is formed easily in a direction perpendicular to the surface of a magnetic medium, typically a magnetic recording layer on a suitable substrate, resulting from perpendicular anisotropy in the magnetic recording layer. On the other hand, in a longitudinal recording media, magnetization is formed in a direction in a plane parallel to the surface of the magnetic recording layer, resulting from longitudinal anisotropy in the magnetic recording layer.

Thin-film magnetic recording media require small exchange decoupled magnetic particles. Decoupling is commonly achieved by having a non-ferromagnetic material between the ferromagnetic particles. This non magnetic region has been formed in the prior art by films having a higher percent composition of either chromium, boron, or an oxide material at the boundaries between magnetic particles than within the magnetic particles. Separation of magnetic particles is imperfect, and some separation mechanisms are difficult to apply in a manufacturing process. An improved magnetic grain isolation method is desired.

SUMMARY OF THE INVENTION

The invention provides a perpendicular magnetic recording medium having high areal recording density exhibiting low DC noise and high media signal-to-noise ratio (SNR). One way of achieving this goal is to produce a perpendicular magnetic media having an amorphous soft magnetic film and a granular magnetic recording layer, wherein the granular layer contains ferromagnetic grains and a non-ferromagnetic phase containing non-oxygen containing material(s).

One embodiment of this invention relates to a magnetic recording medium comprising a substrate, a soft underlayer of 30 nm or greater thickness and a magnetic recording layer, in this order, the magnetic recording layer comprising a non-magnetic region between magnetic grains, wherein the non-magnetic region comprises metal nitride and provides exchange decoupling between the magnetic grains. Preferably, the metal nitride is selected from the group consisting of cobalt nitride, boron nitride, aluminum nitride, titanium nitride, silicon nitride, zirconium nitride, vanadium nitride, tantalum nitride, chromium nitride, molybdenum nitride, other nitrides that can be formed with elements that are similarly or more reactive with nitrogen than cobalt, and combinations thereof. Preferably, the magnetic recording layer has a thickness of less than 12 nm. Preferably, the soft underlayer is an amorphous soft underlayer. Preferably, the amorphous soft underlayer comprises a material selected from the group consisting of CoZrNb, CoTaZr, CoFeZr, FeCoZrB, FeCoB and combinations thereof. Preferably, the amorphous soft underlayer has an average surface roughness (Ra) of less than 0.4 nm. Preferably, the amorphous soft underlayer is thicker than the magnetic recording layer.

Another embodiment of this invention relates to a magnetic recording medium comprising a substrate, a soft underlayer of 30 nm or greater thickness and a magnetic recording layer, in this order, the magnetic recording layer comprising a non-magnetic region between magnetic grains, wherein the non-magnetic region comprises metal carbide and provides exchange decoupling between the magnetic grains.

Yet another embodiment relates to a method for reduction of exchange coupling in a perpendicular recording medium, comprising interposing an amorphous soft underlayer of 30 nm or greater thickness between a substrate and a magnetic recording layer comprising a non-magnetic region between magnetic grains and writing data in the magnetic recording layer, wherein the non-magnetic region comprises metal nitride or metal carbide, and further wherein the non-magnetic region of the magnetic recording layer provides exchange decoupling between the magnetic grains. Preferably, the amorphous soft underlayer comprises a material selected from the group consisting of $CoZr_yNb$ and $FeCoB_z$, wherein y is about 5 to 10 and z is about 10 to 15. More preferably, the amorphous soft underlayer is FeCoB. Preferably, the amorphous soft underlayer has a thickness about 100 to about 400 nm. In one variation, the amorphous soft underlayer comprises nanocrystallites in an amorphous phase.

As will be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

FIGS. 2(a) and 2(b) shows magnetic hysteresis loop data in accordance with some embodiments of the invention.

DETAILED DESCRIPTION

Figure 1:
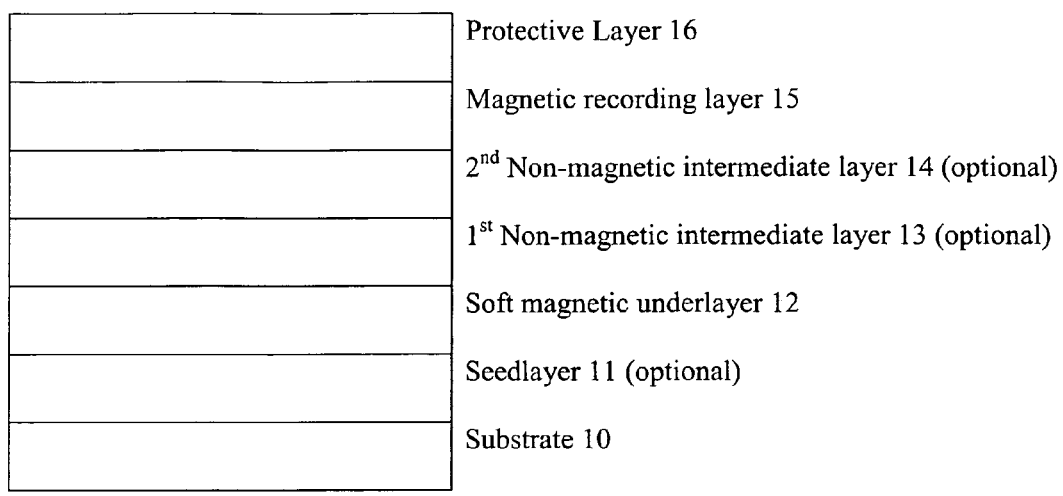
FIG. 1 is a schematic representation of the film structure in accordance with a magnetic recording medium of this invention.

A "soft magnetic material" is a material that is easily magnetized and demagnetized, with coercivity (Hc) below about 100 Oe. As compared to a soft magnetic material, a "hard magnetic" material is one that neither magnetizes nor demagnetizes easily.

This invention provides magnetic recording media suitable for high areal recording density exhibiting high SMNR. This invention achieves such technological advantages by forming a soft underlayer. The underlayer is "soft" because it made of a soft magnetic material, which is defined above, and it is called an "underlayer" because it resides under a recording layer. In a preferred embodiment, the soft layer is amorphous. The term "amorphous" means that the material of the underlayer exhibits no predominant sharp peak in an X-ray diffraction pattern as compared to background noise. The "amorphous soft underlayer" of this invention encompasses nanocrystallites in amorphous phase or any other form of a material so long the material exhibits no predominant sharp peak in an X-ray diffraction pattern as compared to background noise.

In accordance with this invention, "average surface roughness ($R_a$)" refers to the arithmetic average of the absolute values of the surface height deviations measured from a mean plane. The value of the mean plane is measured as the average of all the Z values within an enclosed area. The mean can have a negative value because the Z values are measured relative to the Z value when the microscope is engaged. This value is not corrected for tilt in the plane of the data; therefore, plane fitting or flattening the data will change this value.

$$R_a = [|Z_1| + |Z_2| + \ldots + |Z_n|]/N$$

The surface parameters of a layer such as that of the soft underlayer could be measured by atomic force microscope (AFM). The AFM used to characterize this invention has the trade name NanoScope.® The statistics used by the AFM are mostly derived from ASME B46.1 ("Surface Texture: Surface Roughness, Waviness and Law") available from the American Society of Mechanical Engineers, which is incorporated herein by reference.

In accordance with embodiments of this invention, the substrates that may be used in the invention include glass, glass-ceramic, NiP/aluminum, metal alloys, plastic/polymer material, ceramic, glass-polymer, composite materials or other non-magnetic materials. Glass-ceramic materials do not normally exhibit a crystalline surface. Glasses and glass-ceramics generally exhibit high resistance to shocks.

A preferred embodiment of a perpendicular recording medium of this invention is shown in FIG. 1. The thickness of seedlayer 11 is about 0.1-20 nm, preferably, about 1-8 nm. The thickness of the amorphous soft magnetic underlayer 12 is preferably greater than 30 nm, more preferably, about 100-400 nm, and the thickness of magnetic recording layer 15 deposited on the underlayer is about 10-20 nm. In between the amorphous soft magnetic underlayer 12 and the magnetic recording layer 15 could be intermediate layers 13 and 14 of thickness of about 5-30 nm. Protective layer 16 typically covers the magnetic recording layer 15.

A preferred embodiment of this invention is a perpendicular recording medium comprising an amorphous soft underlayer and a recording layer. The amorphous soft underlayer should preferably be made of soft magnetic materials, and may in some cases further comprise lamination of one or more thin nonmagnetic layers. The recording layer should preferably be made of hard magnetic materials. The amorphous soft underlayer is relatively thick compared to other layers. Any layer between the amorphous soft underlayer and the recording layer is called an interlayer or an intermediate layer. An interlayer can be made of more than one layer of non-magnetic materials. The purpose of the interlayer is to prevent an interaction between the amorphous soft magnetic underlayer and recording layer. An interlayer could also promote the desired properties of the recording layer. Longitudinal recording media do not have an amorphous soft magnetic underlayer. Therefore, the layers named as "underlayer," "seed layer," "sub-seed layer," or "buffer layer" of longitudinal media are somewhat equivalent to the intermediate layer(s) of perpendicular media.

The underlayer and magnetic recording layer could be sequentially sputter deposited on the substrate, typically by magnetron sputtering, in an inert gas atmosphere. A carbon overcoat could be typically deposited in argon with nitrogen, hydrogen or ethylene. Conventional lubricant topcoats are typically less than about 20 Å thick.

When soft underlayers are fabricated by magnetron sputtering on disk substrates, there are several components competing to determine the net anisotropy of the underlayers: effect of magnetron field, magnetostriction of film and stress originated from substrate shape, etc. A seedlayer, which could be optionally added as a layer lying in between the substrate and the soft underlayer, can often control anisotropy of the soft underlayer by promoting microstructure that exhibit either short-range ordering under the influence of magnetron field or different magnetostriction. A seedlayer could also alter local stresses in the soft underlayer.

Amorphous soft underlayers produced smoother surfaces as compared to polycrystalline underlayers. Therefore, it was recognized by this invention that the use of amorphous soft underlayer is one way of reducing the roughness of the magnetic recording media for high-density perpendicular magnetic recording. The amorphous soft underlayers materials include CoZrNb, CoTaZr, CoFeZr, FeCoZrB and FeCoB. In one variation, for example, the amorphous soft underlayer could comprise a material selected from the group consisting of $CoZr_yNb$ and $FeCoB_z$, wherein y is about 5 to 10 and z is about 10 to 15.

Another advantage of amorphous materials as soft underlayer materials is the lack of long-range order in the amorphous material. Without a long-range order, amorphous alloys have substantially no magnetocrystalline anisotropy. According to this invention, the use of amorphous soft underlayer is one way of reducing noise caused by ripple domains and surface roughness. The surface roughness of the amorphous soft underlayer is preferably below 0.4 nm, more preferably below 0.3 nm, and most preferably below 0.2 or 0.1 nm.

Furthermore, it was found during this invention that a granular magnetic recording layer, wherein the granular layer contains ferromagnetic grains and a non-ferromagnetic phase containing non-oxygen containing material(s), in conjunction with the soft underlayer, preferably, an amorphous soft underlayer, can decrease exchange coupling of the ferromagnetic grains.

In one embodiment, the nonmagnetic phase in the granular layer could be formed by reactive sputtering using non-oxygen containing gasses such as nitrogen, $NH_3$ and/or a hydrocarbon gas such as ethylene. The resulting granular layer contained a nonmagnetic phase distributed preferentially between magnetic grains to decrease exchange coupling. Examples of the materials of the nonmagnetic phase of the granular layer include metal nitride or metal carbide that provides decoupling between magnetic grains. Preferred examples include cobalt nitride, boron nitride, aluminum nitride, titanium nitride, silicon nitride, zirconium nitride, vanadium nitride, tantalum nitride, chromium nitride, molybdenum nitride, and other nitrides that can be formed with elements that are similarly or more reactive with nitrogen than cobalt. Other preferred examples include cobalt carbide, boron carbide, aluminum carbide, titanium carbide, silicon carbide, zirconium carbide, vanadium carbide, tantalum carbide, chromium carbide, molybdenum carbide, and other carbides that can be formed with elements that are similarly or more reactive with carbon than cobalt. FIG. 2 shows hysteresis loop data from embodiments of the invention wherein nitrogen gas is reactively sputtered to form a nonmagnetic phase of the granular layer comprising metal nitrides including Co—N, Nb—N, Ti—N, and Al—N. In each case it is demonstrated in FIG. 2a that magnetic hysteresis loop parameter Hc increases more than Hn as reactive nitrogen gas level increases. FIG. 2b shows that Hc-Hn, a figure of merit for reduction of exchange coupling by formation of nonmagnetic phases, also increases with increasing reactive nitrogen gas used to react with Nb, Ti, and Al. This process thus provides a controlled method to improve and optimize granular perpendicular recording media by reducing exchange coupling. These embodiments illustrate the capability to apply the non-oxygen method and apparatus of the invention to a wide range of materials and deposition gas systems, and are not in any manner defining a limitation of the invention. In some embodiments of the invention, the interlayer comprises a Ru-containing alloy deposited so as to form a strong c-axis normal to the film-plane crystallographic growth orientation. In some embodiments the strong c-axis growth orientation is formed by initiating Ru-alloy sputter at low argon gas pressure onto a <111> oriented seed layer on an amorphous soft underlayer material. In some embodiments, Ru-alloy sputter gas pressure is increased to above 15 mTorr so as to form a Ru-alloy surface topography including grains separated by grain boundary grooves, by the method of "sputter shadowing." In some embodiments, the granular recording layer is deposited at a sputter pressure above 15 mTorr so as to increase the phase separation between the magnetic Co—Pt containing metal alloy phase and the nonmagnetic phase comprising an element reacted with a material such as carbon, nitrogen, or other halogen. In more preferred embodiments, the sputter system is a static or pass-through production deposition system producing more than 300 units per hour, and the sputter pressure of the Ru-alloy and granular recording layers are both between 25-100 mTorr.

Nitridation was found to be further advantageous in that it can be applied in concert with other grain isolation mechanisms such as oxidation, and forms nonmagnetic materials with less susceptibility to further post-processing corrosion in, for example, a humid environment. Nitridation further offered a broader range of molecular diffusivity and film density than oxidation alone, that increases control of lateral composition and film density profiles, providing better capability to control important media parameters such as magnetic anisotropy (Hk) variation and corrosion resistance.

Non-oxide materials such as titanium nitride, titanium carbide, tantalum nitride, tantalum carbide, boron nitride, cobalt nitride, cobalt carbide, and other metal carbides, nitrides, and other halides may also be included in the sputter target and directly sputtered. Such method can also reduce exchange decoupling by formation of non-magnetic grain boundary phases.

The advantageous characteristics attainable by the present invention, particularly as related to reduction or elimination of DC noise and increase of media SNR, are illustrated in the following examples.

EXAMPLES

All samples described in this disclosure were fabricated with DC magnetron sputtering except carbon films were made with AC magnetron sputtering. Example data demonstrating the reduction of exchange coupling by reactive sputtering with nitrogen are explained herein. Generally, lowering exchange coupling of perpendicular recording media causes their magnetic hysteresis loops to become more sheared, and correspondingly have a larger difference between coercive field (Hc) and nucleation field (Hn). There are many prior examples of this relationship between exchange coupling and Hc-Hn for CoCr-based and reactive oxygen-based sputtered perpendicular recording media. In this invention, for three different types of CoPtX+nitrogen media, reduction of exchange coupling by reactive nitridation has been demonstrated by data plotted in FIGS. 2(a) and 2(b). In particular, nitridation appears to be competitive with oxidation as a means for decoupling magnetic grains in recording media.

Common magnetic hysteresis loop parameters of interest for perpendicular media are Hc and Hn. Generally one would want fairly high Hc and a small, positive value of Hn. A figure of merit for exchange coupling is Hc-Hn. Larger values of Hc-Hn correlate to less exchange coupling. Good media generally have high values of Hc-Hn combined with high Hc, above 4 kOe. FIGS. 2(a) and 2(b) show that, for zero nitrogen flow, Hc-Hn is low. Thus, exchange coupling is too high.

For these embodiments of the process of this invention, a flow of nitrogen ~0.6 sccm reacts with each media recording layer alloy type, to increase Hc-Hn to about 4 kOe, and increase Hc to about 5 kOe. The reactive nitrogen process thus provides a controlled method to improve and optimize media by reducing exchange coupling. FIG. 2 shows hysteresis loop data from embodiments of the invention wherein nitrogen gas is reactively sputtered to form a nonmagnetic phase of the granular layer comprising metal nitrides including Co—N, Nb—N, Ti—N, and Al—N. In each case it is demonstrated in FIG. 2a that magnetic hysteresis loop parameter Hc increases more than Hn as reactive nitrogen gas level increases. FIG. 2b shows that Hc-Hn, a figure of merit for reduction of exchange coupling by formation of nonmagnetic phases, also increases with increasing reactive nitrogen gas used to react with Nb, Ti, and Al. This process thus provides a controlled method to improve and optimize granular perpendicular recording media by reducing exchange coupling. These embodiments illustrate the capability to apply the non-oxygen method and apparatus of the invention to a wide range of materials and deposition gas systems, and are not in any manner defining a limitation of the invention.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. Persons skilled in the art would recognize that the numerical ranges disclosed inherently support any range within the disclosed numerical ranges even though a precise range limitation is not stated verbatim in the specification because this invention can be practiced throughout the disclosed numerical ranges. A holding to the contrary would "let form triumph over substance" and allow the written description requirement to eviscerate claims that might be narrowed during prosecution simply because the applicants broadly disclose in this application but then might narrow their claims during prosecution. Finally, the entire disclosure of the patents and publications referred in this application are hereby incorporated herein by reference.

The invention claimed is:

1. A magnetic recording medium comprising a substrate, a soft underlayer of 30 nm or greater thickness and a magnetic recording layer, in this order, the magnetic recording layer comprising a non-magnetic region between magnetic grains, wherein the non-magnetic region comprises metal nitride or metal carbide and provides exchange decoupling between the magnetic grains, wherein the soft underlayer comprises CoZrNb or FeCoB, and further wherein the soft underlayer has an average surface roughness (Ra) of less than 0.3 nm.

2. The magnetic recording medium of claim 1, wherein the metal nitride is selected from the group consisting of cobalt nitride, niobium nitride, boron nitride, aluminum nitride, titanium nitride, silicon nitride, zirconium nitride, vanadium nitride, tantalum nitride, chromium nitride, molybdenum nitride, other nitrides that can be formed with elements that are similarly or more reactive with nitrogen than cobalt, and combinations thereof.

3. The magnetic recording medium of claim 1, wherein the magnetic recording layer has a thickness of less than 12 nm.

4. The magnetic recording medium of claim 1, wherein the soft underlayer is an amorphous soft underlayer.

5. The magnetic recording medium of claim 4, wherein the amorphous soft underlayer is thicker than the magnetic recording layer.

6. The magnetic recording medium of claim 1, wherein the metal carbide is selected from the group consisting of cobalt carbide, boron carbide, aluminum carbide, titanium carbide, silicon carbide, zirconium carbide, vanadium carbide, tantalum carbide, chromium carbide, molybdenum carbide, other carbides that can be formed with elements that are similarly or more reactive with carbon than cobalt, and combinations thereof.

7. The magnetic recording medium of claim 1, wherein the magnetic grains comprise CoPtX, wherein X is selected from the group consisting of Al, Ti, V, Cr, Ni, Cu, Zn, Y, Zr, Nb, Mo, Ru, Rh, Pd, Ag, Hf, Ta, W, Re, Ir, and Au, and combinations thereof.

8. A method for reduction of exchange coupling in a perpendicular recording medium, comprising interposing an amorphous soft underlayer of 30 nm or greater thickness between a substrate and a magnetic recording layer comprising a non-magnetic region between magnetic grains and writing data in the magnetic recording layer, wherein the non-magnetic region comprises metal nitride or metal carbide, and further wherein the non-magnetic region of the magnetic recording layer provides exchange decoupling between the magnetic grains, wherein the amorphous soft underlayer comprises CoZrNb or FeCoB, and further wherein the amorphous soft underlayer has an average surface roughness (Ra) of less than 0.3 nm.

9. The method of claim 8, the amorphous soft underlayer comprises a material selected from the group consisting of $CoZr_y Nb$ and $FeCoB_x$, wherein y is about 5 to 10 and z is about 10 to 15.

10. The method of claim 8, wherein the amorphous soft underlayer has a thickness about 100 to about 400 nm.

11. The method of claim 8, wherein the amorphous soft underlayer comprises nanocrystallites in an amorphous phase.

12. A magnetic recording medium comprising a substrate, a soft underlayer of 30 nm or greater thickness and a magnetic recording layer, in this order, the magnetic recording layer comprising a non-magnetic region between magnetic grains, wherein the non-magnetic region comprises metal nitride and provides exchange decoupling between the magnetic grains, wherein the metal nitride is selected from the group consisting of cobalt nitride, niobium nitride, zirconium nitride, vanadium nitride, tantalum nitride, chromium nitride, molybdenum nitride, and combinations thereof, wherein the soft underlayer comprises a material selected from the group consisting of CoFeZr, FeCoZrB, FeCoB and combinations thereof, wherein the soft underlayer has an average surface roughness (Ra) of less than 0.3 nm.

13. The magnetic recording medium of claim 12, wherein the soft underlayer is an amorphous soft underlayer.

14. A magnetic recording medium comprising a substrate, a soft underlayer of 30 nm or greater thickness and a magnetic recording layer, in this order, the magnetic recording layer comprising a non-magnetic region between magnetic grains, wherein the non-magnetic region comprises metal carbide and provides exchange decoupling between the magnetic grains, wherein the metal carbide is selected from the group consisting of cobalt carbide, boron carbide, aluminum carbide, silicon carbide, zirconium carbide, vanadium carbide, tantalum carbide, chromium carbide, molybdenum carbide, and combinations thereof, wherein the soft underlayer comprises a material selected from the group consisting of CoFeZr, FeCoZrB, FeCoB and combinations thereof, wherein the soft underlayer has an average surface roughness (Ra) of less than 0.3 nm.

15. The magnetic recording medium of claim 14, wherein the magnetic grains comprise CoPtX, wherein X is selected from the group consisting of Al, Ti, V, Cr, Ni, Cu, Zn, Y, Zr, Nb, Mo, Ru, Rh, Pd, Ag, Hf, Ta, W, Re, Ir, and Au, and combinations thereof.

* * * * *